(12) United States Patent
Elboth et al.

(10) Patent No.: US 10,649,108 B2
(45) Date of Patent: May 12, 2020

(54) SYSTEM AND METHOD FOR GENERATING DITHERING SEQUENCES FOR SEISMIC EXPLORATION

(71) Applicant: CGG SERVICES SAS, Massy (FR)

(72) Inventors: Thomas Elboth, Oslo (NO); Vetle Vinje, Oslo (NO)

(73) Assignee: CGG SERVICES SAS, Massy (FR)

( * ) Notice: Subject to any disclaimer, the term of this patent is extended or adjusted under 35 U.S.C. 154(b) by 248 days.

(21) Appl. No.: 15/787,928

(22) Filed: Oct. 19, 2017

(65) Prior Publication Data
US 2019/0120990 A1    Apr. 25, 2019

(51) Int. Cl.
*G01V 1/38* (2006.01)
(52) U.S. Cl.
CPC .......... *G01V 1/3861* (2013.01); *G01V 1/3808* (2013.01); *G01V 2210/121* (2013.01)
(58) Field of Classification Search
CPC ............... G01V 1/3861; G01V 1/3808; G01V 2210/121
(Continued)

(56) References Cited

U.S. PATENT DOCUMENTS

| 3,811,111 A | 5/1974 | Barbier et al. |
| 6,882,938 B2 | 4/2005 | Vaage et al. |

(Continued)

FOREIGN PATENT DOCUMENTS

WO    2013105075 A1    7/2013

OTHER PUBLICATIONS

Chao Peng et al., "Deblending of simulated simultaneous sources using an iterative approach: an experiment with variable-depth streamer data", 83th SEG International Annual Meeting, Sep. 22-27, 2013, Houston, Texas, pp. 4278-4282.

(Continued)

*Primary Examiner* — Daniel L Murphy
(74) *Attorney, Agent, or Firm* — Patent Portfolio Builders PLLC

(57) ABSTRACT

System and method for generating discrete dithering sequences $DS_i$ for marine seismic sources $S_i$ in a marine acquisition system. The method includes determining a number N of the seismic sources $S_i$ to be fired; calculating a dithering sequence $DS_i$ for each source $S_i$ such that when any two consecutive source activation $S_k$ and $S_l$, where $l=k+1$, are selected, a combination $DS_{kl}$ of their dithering sequences $DS_k$ and $DS_l$ is a uniform random low-discrepancy sequence; and driving each source $S_i$ with the corresponding dithering sequence $DS_i$ to generate blended seismic data.

20 Claims, 18 Drawing Sheets

(58) Field of Classification Search
USPC .......................................................... 367/23
See application file for complete search history.

(56) References Cited

U.S. PATENT DOCUMENTS

| | | |
|---|---|---|
| 6,906,981 B2 | 6/2005 | Vaage |
| 8,681,581 B2 | 3/2014 | Moldoveanu et al. |
| 8,711,654 B2 | 4/2014 | Moldoveanu et al. |
| 8,837,255 B2 | 9/2014 | Ross et al. |
| 9,075,162 B2 | 7/2015 | Baardman et al. |
| 9,945,972 B2 | 4/2018 | Baardman et al. |
| 2011/0199858 A1* | 8/2011 | Otnes .................. G01V 1/36 367/38 |
| 2012/0147699 A1 | 6/2012 | Dellinger et al. |
| 2014/0269169 A1 | 9/2014 | van Borselen et al. |
| 2014/0362663 A1 | 12/2014 | Jones et al. |
| 2017/0235003 A1 | 8/2017 | Elboth et al. |
| 2018/0052248 A1 | 2/2018 | Beitz et al. |

OTHER PUBLICATIONS

Ed Hager et al., "Baxter: a high resolution penta-source marine 3D acquisition", 86th SEG International Annual Meeting, Oct. 16-21, 2016, Dallas, Texas, pp. 173-177.

G. Poole et al., "Blended dual-source acquisition and processing of broadband data", 76th EAGE Conference & Exhibition, Jun. 16-19, 2014, Amsterdam, The Netherlands.

Ian Moore et al., "Simultaneous source separation using dithered sources", 78th SEG Annual International Meeting, Nov. 9-14, 2008, Las Vegas, Nevada, pp. 2806-2809.

M. Maraschini et al., "Source Separation by Iterative Rank Reduction—Theory and Applications", 74th EAGE Conference & Exhibition incorporating SPE EUROPEC 2012, Jun. 4-7, 2012, Copenhagen, Denmark.

Vetle Vinje et al., "Shooting over the seismic spread", First Break, Jun. 2017, vol. 35, No. 6, pp. 97-104.

Baardman, R., et al.; "Separating Sources in Marine Simultaneous Shooting acquisition—Method & Applications"; SEG Las Vegas 2012 Annual Meeting; Nov. 4-9, 2012; pp. 1-5.

Baardman, R., et al.; "A simulated Simultaneous Source Experiment in Shallow waters and the Impact of Randomization Schemes"; SEG Houston 2013 Annual Meeting; Sep. 22-27, 2013; pp. 4382-4386.

Fromyr, E.; "Blended Acquisition—a potential step-change in geophysical flexibility and operational efficiency"; Fifteenth International Congress of the Brazilian Geophysical Society; Jul. 31-Aug. 3, 2017; pp. 768-771.

Moldoveanu, N.; "Random Sampling: A New Strategy for Marine Acquisition"; SEG Denver 2010 Annual Meeting; Oct. 17-22, 2010; pp. 51-56.

Extended European Search Report in related/corresponding European Patent Application No. 19306062.1 dated Jan. 30, 2020.

Gary Hampson et al., "Acquisition using simultaneous sources," The Leading Edge, Society of Exploration Geophysicists, US, Jul. 2008, pp. 918-923, vol. 27, No. 7, XP001513543.

T. Elboth et al., "Reduced Volume And Hexa-Source Marine Acquisition in the Barents Sea," We MA 02, Marine Acquisition Workshop, Aug. 22-24, 2018, Oslo, Norway, 5 pages, XP055659121.

* cited by examiner

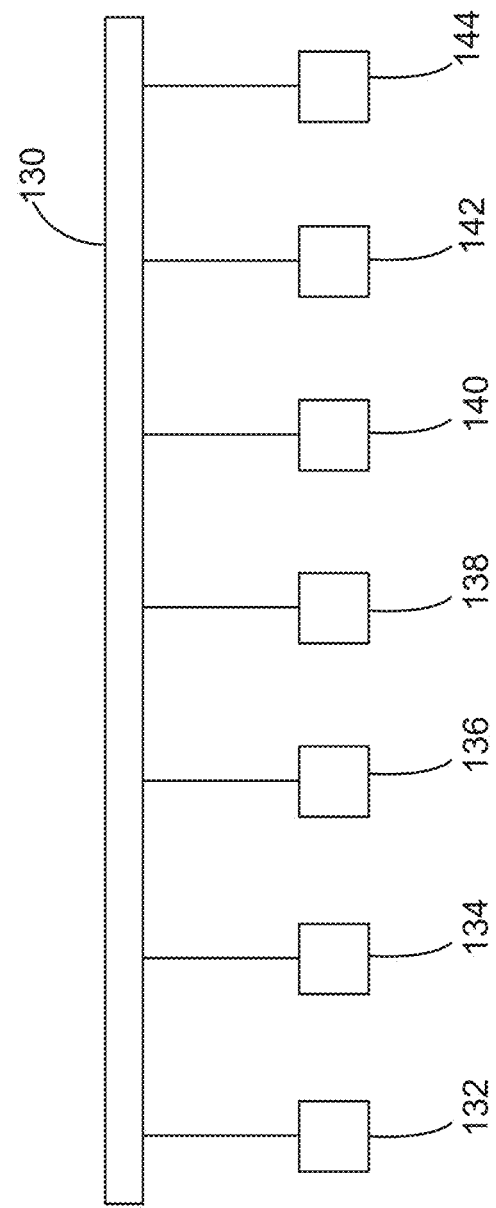

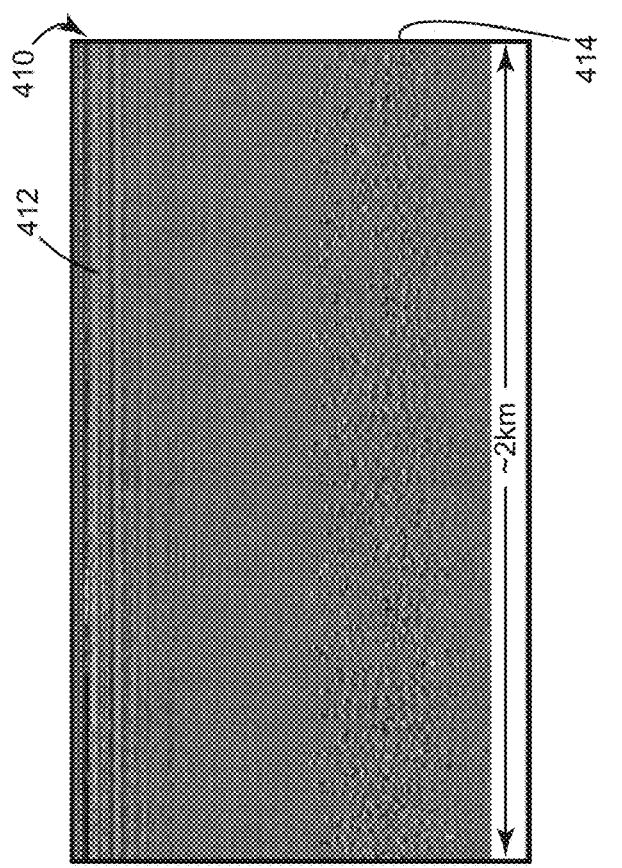
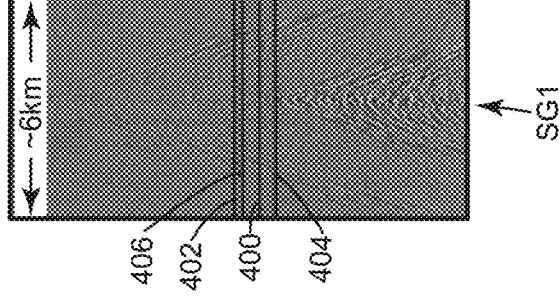
FIG. 4A
FIG. 4B

FIG. 7

```
% Step A: Produce a random numbers sequence S with entries that are well separated
Npoints = 200              %# of low discrepancy points we want in [0,1] range
f=[0.20 0.16 0.10 0.07 0.04]   %array given minimum distance form the ~5 previous
points
N=5                        %counter
S=zeros (2*Npoints,1);     %array holding the low discrepancy numbers
while (N<2*Npoints)        %create 2N points in extended interval
    c=rand (1);            %get a random number [0 1] range
    %check if c is sufficiently different from the ~5 previously selected numbers
    if( abs(S(N)-c)>f(1) && abs (S(N-1)-c)>f(2) && abs (S(N-2)-c)>f(3) && ...
        abs (S(N-3)-c)>f(4) && abs (S(N-4)-c)>f(5) )
        S (N+1) = c;       %accept candidate
        N=N+1;             %update counter
    end
end
% Step B: The problem is that S have too many values clustered near 0 and 1.
%We therefore discard these values to get a nice and flat distribution
S2=zeros (Npoints,1);      %temporary work array
count=1;
for i=1 : 2*Npoints
    if( S(i)>0.2 && S(i)<0.8    %cut away these entries because there are too many of
them
        S2(count) = S (i)
        count=count+1
    end
end
S=S2(1:Npoints);           %we only want th4e first Npoints
S=S-0.2;    S=S/0.6;       %scale back to [0-1] range
```

702 — Step A line
708 — f array line
706 — N=5 line
704 — c=rand line
710 — accept candidate block
720 — Step B block
722 — scale back line
700 — overall code

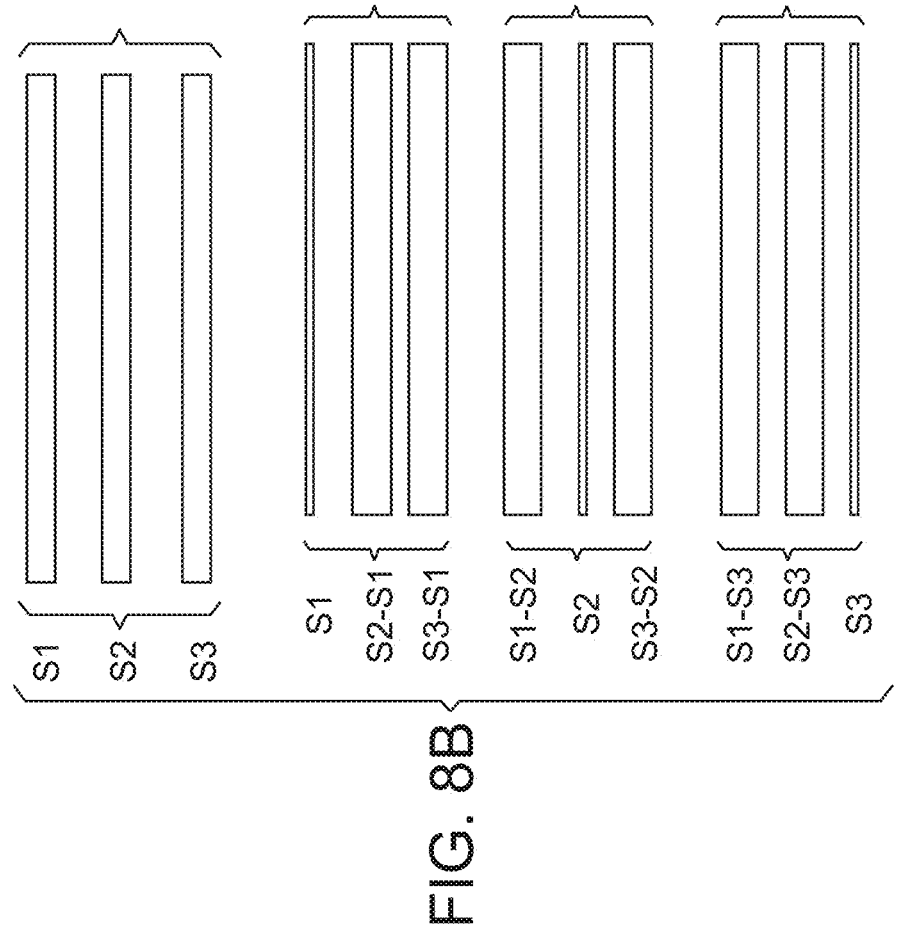
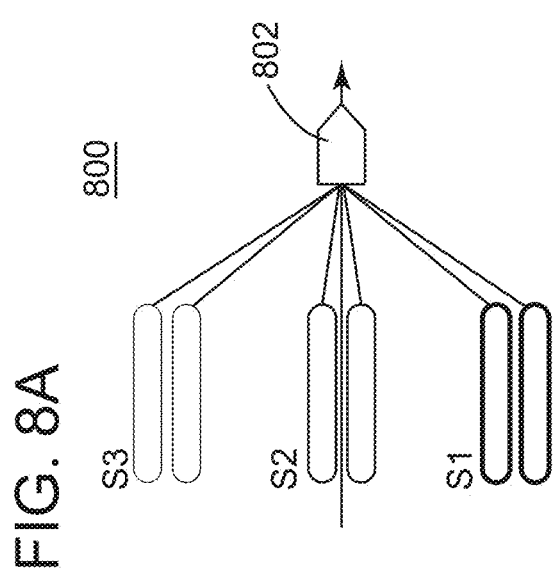

FIG. 10B

```
nPoints=500;      %Number of dithers that are requested (while
                  %loop)
nBacksteps = 7;   %Number of dithers that are requested (while
                  %discrepancy [4-10]
%The anti-clustering weights
for i=1 :nBacksteps; f1(i) = 0.27 * (0.94 ^(i-1)); end; f=f1;

source_d=zeros (no_src,nPionts+nBacksteps+1) ;   %array to hold
                                                 %dithering times
t=nBacksteps+1;  count=0;   scale=-1;            %counters
while (t<nPoints+nBacksteps+1)
       %Gradually scale the f-weights down to ensure we always get a
       %solution
    if(mod(count,1000)==0) ; scale=scale+1  f=f1*(0.95^ scale);   end my_coutinue=true;
    C_Numb = rand(3,1) ;%Draw candidate dithering times for 3
                        %sources
    for  i=1 : nBacksteps  %Does candidate fulfill anti-clustering
                           %recq?
        if ( abs((C_Numb(1)-C_Numb(2))-(source_d(1,t-i+1)-
source_d(2,t-i+1)) )<f(i) ... %S1 (i)-S2(i)
         || abs((C_Numb (2)-C_Numb(3))-source_d(2,t-i+1)-
source_d(3,t-i+1)) )<f(i) ... %S2 (i)-S3(i)
         || abs((source_d(3,t)-C_Numb(3))-source_d(3,t-i)-
source_d(1,t-i+1)) )<f(i) ... %S3 (i)-S1(i+1)
            my_coutinue=false;  break;  %no solution found
        end
    end
    if (my_continue==true)  %solution found, and accepted
        t=t+1;   count=0;   f=f1;   scale=-1;
        for i=1:no_src;  source_d(i,t)  = C-Numb(i);  end
    end                     %keep track of the number of trials
    count=count+1;
end
%------------------------------------------------------------
---------------------
%Just n-values - as requested by the user. Discard the first
few.
source_d=source_d(1:3,nBacksteps+1:nPoints+nBacksteps ;
```

1002
1004
1006
1008
1010
1012
1014
1016
1018

N +1 Dither

N +2 Dither

FIG. 16

|  | Reflector | Reflector + Irwin-Hall dither, Reflector | Reflector + uniform random low discrepancy dither, Reflector |
|---|---|---|---|
| RMS (without deblend) | 773.6 | 833.7 | 818.3 |
| RMS (with deblend) | 77.36 | 77.36 | 77.36 |
| NRMS (without deblend) |  | 27.40 | 27.60 |
| NRMS (with deblend) |  | 0.77 | 0.67 |

SYSTEM AND METHOD FOR GENERATING DITHERING SEQUENCES FOR SEISMIC EXPLORATION

BACKGROUND

Technical Field

Embodiments of the subject matter disclosed herein generally relate to methods and systems related to seismic exploration and, more particularly, to mechanisms and techniques for generating dithering sequences to be applied to seismic sources for generating seismic waves.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the structures under the seafloor is an ongoing process and the goal for any seismic acquisition survey.

During a seismic gathering process, as illustrated in FIG. 1, a seismic acquisition system 100 includes a vessel 102 that tows a seismic spread 104 (i.e., plural streamers 106 and associated equipment, e.g., float 108). The streamers may be disposed horizontally, i.e., lying at a constant depth relative to a surface of the ocean, slanted or curved related to the ocean surface. Each streamer 106 includes plural seismic sensors 110 (only two are illustrated for simplicity) for recording seismic data.

The vessel also tows two seismic source arrays 122 and 124 that are configured to generate seismic waves. Each seismic source array traditionally includes three sub-array 122A-C and each sub-array includes a given number of seismic source elements. A seismic source sub-array 122A is illustrated in FIG. 2 having a float 130 to which seven seismic source elements 132 to 144 are attached. The typical seismic source element is an airgun.

The seismic waves generated by the seismic source arrays propagate downward, toward the seafloor, and penetrate the seafloor (subsurface) until, eventually, a reflecting structure reflects the seismic wave. The reflected seismic wave propagates upward until it is detected by the seismic sensors on the streamers. Based on this data, an image of the subsurface is generated.

Marine seismic acquisition employing more than two sources is now regularly being used due to the prospect of denser sampling, particularly in the crossline direction, at a similar cost as a conventional acquisition. Due to a reduced temporal shot spacing, final data quality depends on the capability of the processing phase to separate (deblend) the overlapping energy from different sources.

The use of simultaneous shooting has increased in recent years due to its ability to increase efficiency, fold and/or spatial data sampling, often at little or no extra cost (Poole et al., 2014; Peng et al., 2013). In marine acquisition, a commonly used approach to improve crossline sampling is to increase the number of sources beyond the conventional dual-source acquisition (Hager et al., 2016). FIGS. 3A-3C illustrate this idea by comparing the cross-line sampling of a conventional survey having two sources S1 and S2 (see FIG. 3A), a triple-source S1 to S3 arrangement (see FIG. 3B) and a hexa-source (S1 to S6) acquisition system (see FIG. 3C). Each system has the same number of receivers R (the figures show the streamer positions and each streamer has plural receivers). As can be seen at the bottom of these figures, the extra sources effectively improve the cross-line sampling (the density of the wave reflections at the bottom of the figures is increased. The X axis of the figures represent the cross-line and the Y axis is the depth.

To maintain the inline fold, it is tempting to decrease the shot-point interval as the number of sources increases. This will lead to overlapping waves generated by the sources that need to be separated during the processing stage in a process commonly referred to as "deblending." To allow for effective deblending, it is common practice to apply a small random dither to the firing times of each individual source (individual sources are illustrated in FIG. 2). The basic concept is explained with reference to FIGS. 4A and 4B. FIG. 4A shows four consecutive shot gathers SG1 to SG4 from one source-cable combination (i.e., a single cable), where the source was placed directly over the streamer spread (see, for example, Vinje et al., 2017). In FIG. 4A, horizontal lines 400 to 406 indicate how the dithered firing times of each source vary from shot to shot (line 400 corresponds to the first shot, line 402 corresponds to the second shot, line 404 corresponds to the third shot and line 406 corresponds to the fourth shot). When such dithered data is sorted, for example, in the common channel domain (i.e., a single channel from a single streamer is selected and all the seismic data recorded by this channel over time is plotted), as illustrated in FIG. 4B, the first shot 410 appears as straight lines 412 while the next (interfering) shots 414 appear as 'random' noise. Note that the dither shown in FIG. 4A is just random, with no other attributes. In other words, a software routine is used to generate random numbers in a given interval and these random numbers are applied as dither to the pre-determined shot times of the individual sources.

Most deblending algorithms generally take advantage of the dither by trying to iteratively suppress the blending noise and enhance the coherent signal. Examples of both passive and active early deblending algorithms can be found in Babier and Staron, 1971, Vaage et al., 2002, Moore et al., 2008 and Maraschini et al. 2012. It is noted that in the last decade (2007-2017), at least 200 publications on deblending can be found in the EAGE and SEG archives.

However, the existing deblending algorithms are normally not capable of perfect deblending. One reason for this failure of the existing methods is believed to be the clustering of the random dithering times that are applied to the shooting times of the individual sources.

Thus, it is desired to produce new more optimal dithering sequences that overcome these problems.

SUMMARY

According to one embodiment, there is a method for generating discrete dithering sequences $DS_i$ for marine seismic sources $S_i$ in a marine acquisition system. The method includes determining a number N of the seismic sources $S_i$ to be fired; calculating a dithering sequence $DS_i$ for each source $S_i$ such that when any two consecutive source activation $S_k$ and $S_l$, where $l=k+1$, are selected, a combination $DS_{kl}$ of their dithering sequences $DS_k$ and $DS_l$ is a uniform random low-discrepancy sequence; and driving each source $S_i$ with the corresponding dithering sequence $DS_i$ to generate blended seismic data.

According to another embodiment, there is a computing device for generating discrete dithering sequences $DS_i$ for marine seismic sources $S_i$ in a marine acquisition system. The computing device includes an interface configured to receive a number N of the seismic sources $S_i$ to be fired; and a processor connected to the interface. The processor is configured to calculate a dithering sequence $DS_i$ for each source $S_i$ such that when any two consecutive source activations $S_k$ and $S_l$, where l=k+1, are selected, a combination $DS_{kl}$ of their dithering sequences $DS_k$ and $DS_l$ is a uniform random low-discrepancy sequence and to drive each source $S_i$ with the corresponding dithering sequence $DS_i$ to generate blended seismic data.

According to yet another exemplary embodiment, there is a non-transitory computer readable medium including computer executable instructions, wherein the instructions, when executed by a processor, implement instructions for generating discrete dithering sequences $DS_i$ for marine seismic sources $S_i$ in a marine acquisition system, as discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 is a side view of a sub-array of an array source;

FIG. 4A illustrates consecutive seismic shot gathers and FIG. 4B the seismic data sorted in a common channel;

FIG. 7 illustrates a method for generating a random low-discrepancy sequence;

FIG. 8A illustrates a seismic acquisition system having three sources and FIG. 8B illustrates the dithers of two sources when the data is aligned with a third source;

FIG. 10A illustrates a basic algorithm for calculating dithering sequences for three different sources so that a combination of any two of the dithering sequences results in a uniform random low-discrepancy sequence and FIG. 10B illustrates the same algorithm as a pseudo-code;

FIG. 16 illustrates various results obtained with the Irwin-Hall dither of FIG. 15B and the uniform random low-discrepancy dither of FIG. 15C.

DETAILED DESCRIPTION

Figure 1:
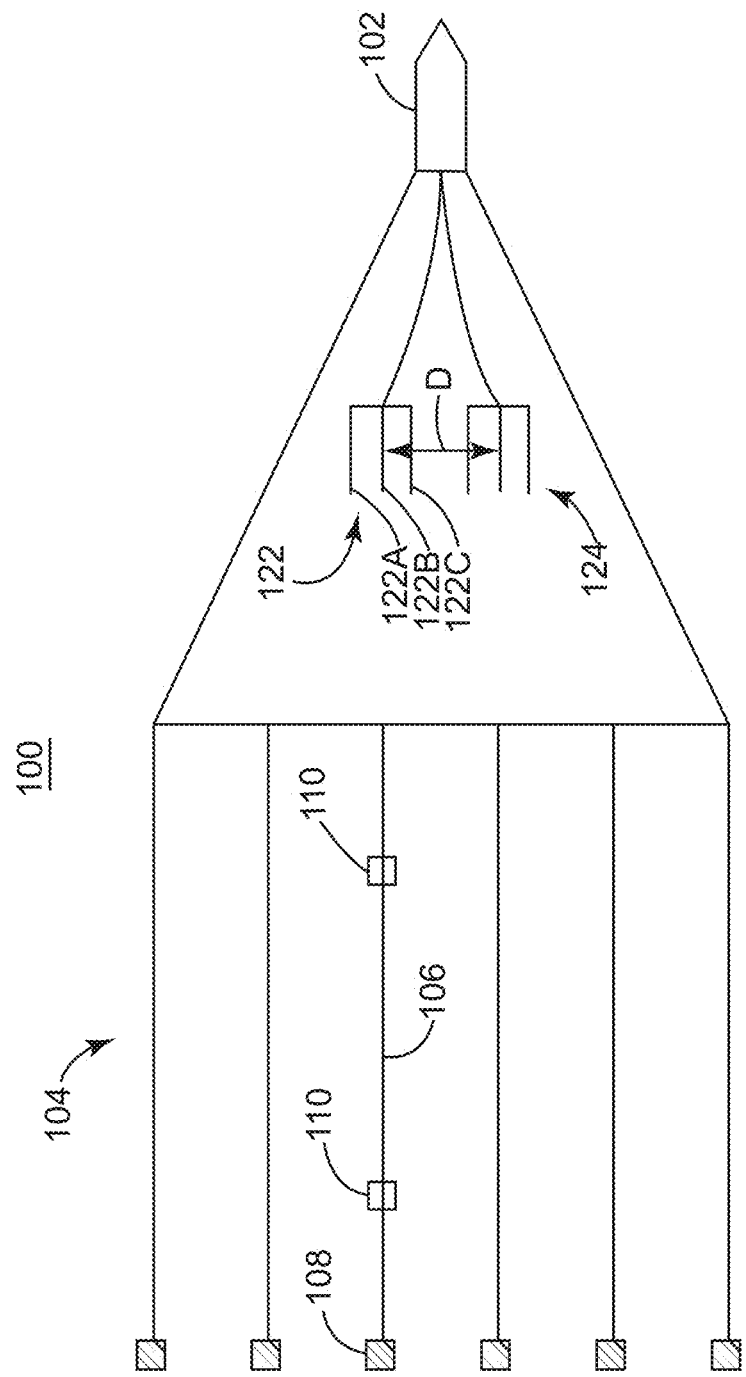
FIG. 1 is a schematic diagram of a conventional seismic survey system.
Figures 3A, 3B, 3C:
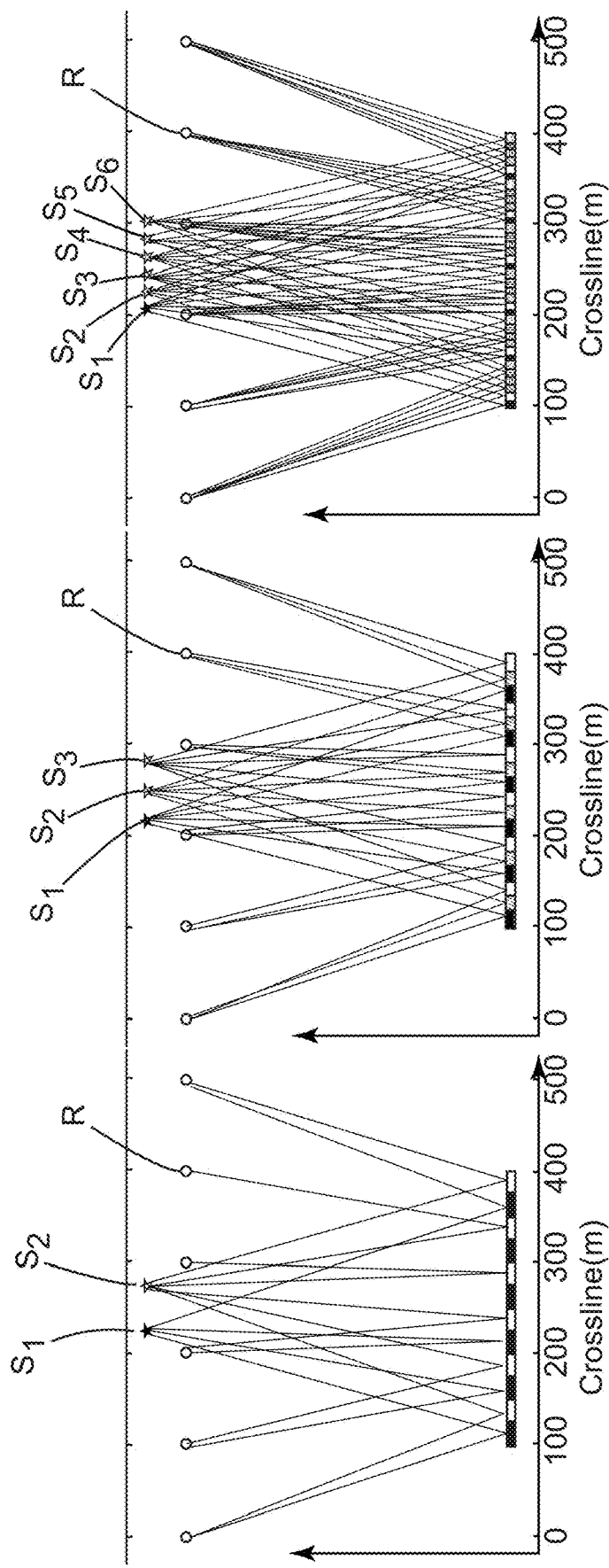
FIGS. 3A-3C illustrate CMP-bins for a two source setup, a triple-source setup and a hexa-source setup.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to two and three seismic sources that are shot according to dithering sequences that have special properties. However, the embodiments to be discussed next are not limited to two or three seismic sources, but they may be applied to a higher number of sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, source dithering is designed in order to help the deblending process. In particular, it will be discussed how to construct dithering sequences for the various sources involved in a seismic survey so that, when combining pairs of such sequences, the resulting sequence may be a discrete, uniform random, low-discrepancy sequence. In probability theory and statistics, a discrete uniform distribution is a symmetric probability distribution where a finite number of values are equally likely to be observed; every one of n values has equal probability 1/n. Another way of saying "discrete uniform distribution" would be "a known, finite number of outcomes equally likely to happen." As plural sources are fired simultaneously (this term is understood to mean that the sources are fired with a small time delay, the "dither," of "jitter" relative to each other), parts of the waves generated by source "n" are blended with parts of the waves generated by source "m" when recorded by a given seismic receiver. As previously discussed with regard to FIGS. 4A and 4B, when the recordings are time aligned for a given source "n," in the common channel domain, the dithering for the given source "n" is leaking into the dithering of the other sources, e.g., source "m." This means that although the dithering of the given source was uniform random and the dithering of the other sources were also uniform random, the combined (leaked) dither will have a distribution, which is not ideal for the deblending processes. A well-known fact in the field of statistics is that the sum of two uniform random dithering sequences forms a so called Irwin-Hall sequence, which is not uniform random. This problem of the existing acquisition methods is now discussed in more detail and solutions are proposed that prevent the leaked dithering from clustering.

Figure 5A:
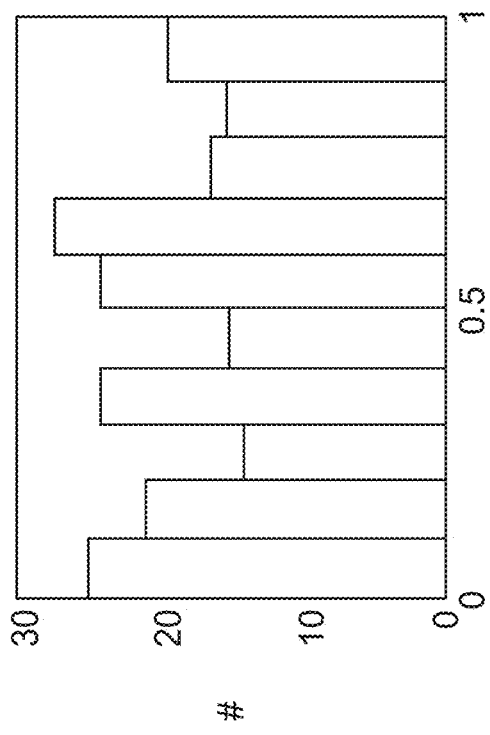
FIGS. 5A and 5B illustrate a random sequence.
Figure 5B:
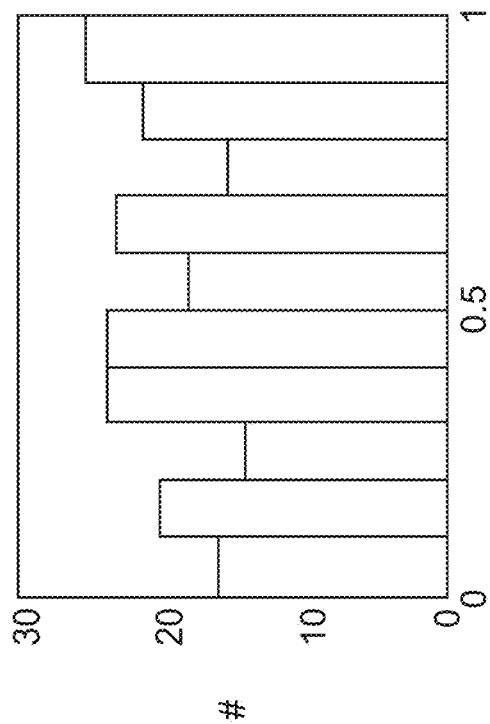

As already discussed above, it is common to generate uniformly random dithering values and apply them to the sources being shot in a given seismic survey. The random dithering ensures that the blending noise is fairly uniformly spread out within a certain selected time-range. An example of a uniform random sequence (200 numbers in the [0, 1] range produced by the rand-function in a mathematical software) is shown in FIG. 5A, while the accompanying histogram is shown in FIG. 5B. By analyzing these random dithering values, it can be seen that a clustering of some data points, indicated by reference number 500, is present. A pure random sequence (as illustrated in FIG. 5A and currently used by the seismic acquisition systems) will have some random clustering, i.e., some nearby values that sometimes tend to be very close, while others seem to be far apart.

For deblending purposes, the clustering is undesired because the collected data may become more coherent, and consequently more difficult to separate in the deblending process. A better and novel solution proposed in this embodiment is using a so called "low-discrepancy" random sequence, which works to avoid this random clustering. The "discrepancy" of a sequence is defined in mathematics as follows. A sequence $\{s_1, s_2, s_3, \ldots\}$ of real numbers is said to be uniformly distributed, if the proportion of terms of the sequence falling in a subinterval is proportional to the length of that sub-interval. In other words, if the sequence includes 9 terms $s_1$ to $s_9$, and the subinterval is a length of 1 m along an axis, the sequence is uniformly distributed if there is a distance of 10 cm between any adjacent two terms along a given axis. If the space in which the sequence is defined is different from an axis (e.g., the space has a volume), then a "measure" is introduced on that space and the "length" of the interval is replaced in the above definition by the "measure" of that space.

This can be expressed in mathematics terms as:

$$\lim_{n \to \infty} \frac{|\{s_1, \ldots, s_n\} \cap [c, d]|}{n} = \frac{d-c}{b-a}, \quad (1)$$

where the numerator of the first term denotes the number n of elements from the sequence that are between numbers c and d, which define the subinterval. Numbers a and b define an interval in which all the elements of the sequence are distributed.

The discrepancy $D_N$ for the sequence $\{s_1, s_2, s_3, \ldots\}$ with respect to the interval [a, b] is defined as:

$$D_N = \sup_{a \leq c \leq d \leq b} \left| \frac{|\{s_1, \ldots, s_N\} \cap [c, d]|}{N} - \frac{d-c}{b-a} \right|. \quad (2)$$

A sequence is uniformly distributed if the discrepancy $D_N$ tends to zero as N tends to infinity. Thus, in the following, the discrepancy of a sequence is low if the proportion of points in the sequence falling into an arbitrary set B is close to proportional to the measure of B, as would happen on average (but not for particular samples) in the case of an uniformly distributed sequence. More mathematical details about this topic may be found in Braaten and Weller, 1979 and Kocis and Whiten, 1997 and the references within.

Some well-known low-discrepancy sequences are the Halton, Sobol, and Faure sequences. However, in their basic form, these sequences are not necessarily ideal for use in a seismic acquisition setting. A few common problems of these sequences are that the derivative and sum of these sequences may not be random, or that a given sequence may be relatively short.

In Borselen and Baardman, 2014, an elaborate algorithm was introduced that made sure that consecutive dithers had a minimum difference. However, the approach in this paper does not necessarily produce a low-discrepancy sequence since it operates by adding small random shifts to fixed repetitive delays.

As is well known, random sequences, like the ones illustrated in FIGS. 5A and 5B, are often used as source dithering times for allowing a better deblending. However, when multiple sources are used, each using such a random sequence, during the processing of the recoded seismic data, the dithering from one source leaks into the dithering of another source, thus making the leaked dithering sequence to exhibit regions of clustering, which is not desirable.

Figure 6A:
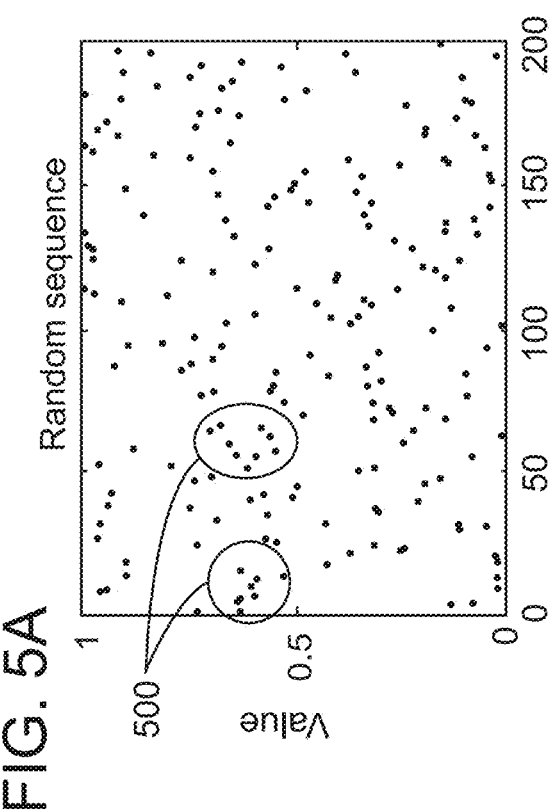
FIGS. 6A and 6B illustrate a low-discrepancy sequence.
Figure 6B:
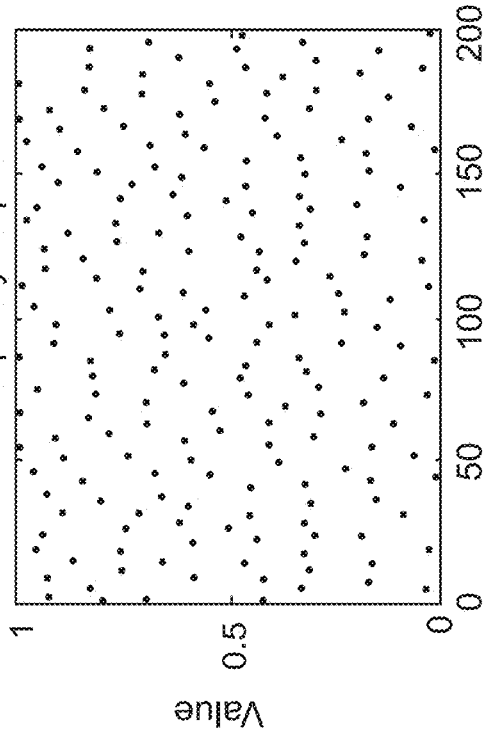

A dithering sequence, when only one source is used, may be constructed to be not only random, but also to have a low-discrepancy (see FIGS. 6A and 6B), which avoids the clustering illustrated in FIGS. 5A and 5B. A two-step algorithm 700 to achieves such good low-discrepancy sequence is illustrated as a pseudo-code in FIG. 7. This algorithm was used to produce the distribution seen in FIGS. 6A and 6B. The algorithm 700 starts with step A for producing a random number sequence S having Npoints=200 elements in the range [0, 1]. A function f 702 is selected for calculating a minimum distance between a new point c 704 that is generated in the sequence S and the previous N numbers 706 of the sequence. For this reason, function f has N different values, one for each of the previous N random numbers. After the sequence S is initiated with zero values in step 708 and having a double number of entries than the desired Npoints, a new number c is generated (step 704) and compared in step 710 to the previous N (5 in this example) numbers of the sequence based on function f. If the result indicates that the new number c is sufficiently far away from the previous N numbers, the new candidate c is accepted as the next number of the sequence S. If not, the candidate c is dropped and a new candidate is generated. The candidate may be generated using a random function in a known computer software environment.

After generating twice the necessary number of elements Npoints for the sequence, the process advances then to step B for reducing the number of elements in the sequence S. In this regard, remember that the sequence S has been generated in step 708 with more elements than necessary. In step 720, only those elements of the sequence that are larger than a first threshold (0.2 in this example) and smaller than a second threshold (0.8 in this example) are kept. All the other elements are removed. This is so because the values closer to the edges of the selected interval [0,1] have a tendency to cluster. To bring the elements in the sequence S to the desired number Npoints, in step 722 only the first Npoints are kept and they are also scaled to cover the entire interval [0, 1].

In numerical experiments, see, for example, Diarra 2016, it was shown that such a low-discrepancy sequence typically improves the normalized root mean square (NRMS) (of deblended vs. unblended) stacks with a few percent compared to using a pure random sequence.

In the algorithm discussed above with regard to FIG. 7, each candidate random number was compared with the N last accepted numbers, and it was required that it has a minimum absolute difference from each of these numbers. This minimum absolute difference was achieved using the f function. The weights given by the f function, and the number N of previous values to check may vary. After discarding in step B the values near the minimum and maximum dither times, where they tend to cluster, the resulting sequence is a uniform random low-discrepancy sequence.

However, when applying the uniform random low-discrepancy sequence to each source in a multi-source seismic acquisition system may not always be what is needed to achieve good deblending. In this regard, as an example, consider the acquisition system 800 illustrated in FIG. 8A. The system 800 includes a vessel 802 that tows three sources S1 to S3 (source arrays in this case). To enable system 800 to extend the effective recording time in processing, the firing time of each source is dithered with a dither in the range [0, 1] s. In practice, deblending is achieved by first sorting the recorded seismic data to a common channel and then aligning, sequentially, the recorded seismic data for the firing time of shot S1, S2 and S3 respectively. Notice in FIG. 8B that when the seismic data is aligned for source S1, the effective dither S2-S1 and S3-S1 for sources S2 and S3 will be distributed over a range [0-2] s. This is equivalent to considering that the dither of the aligned source (S1 in this example) leaks into the dithering time of the other sources (S2 and S3 in this case).

Figure 9A:
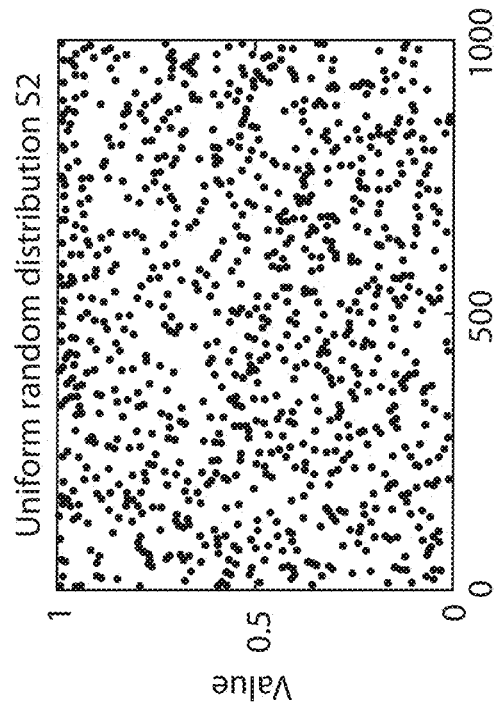
FIGS. 9A and 9B illustrate two uniform random distributions.
Figure 9C:
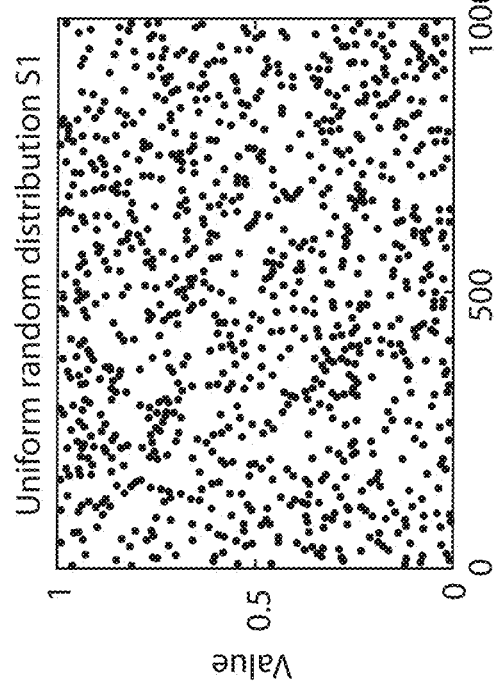
FIGS. 9C and 9D illustrate a result of the combination of the two uniform random distributions.
Figure 9B:
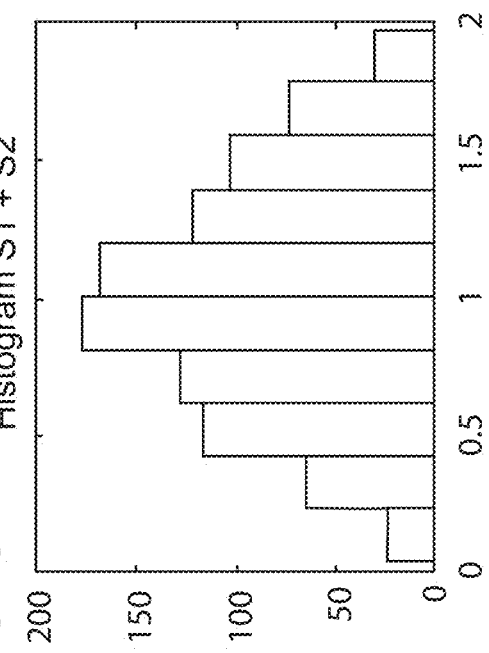
Figure 9D:
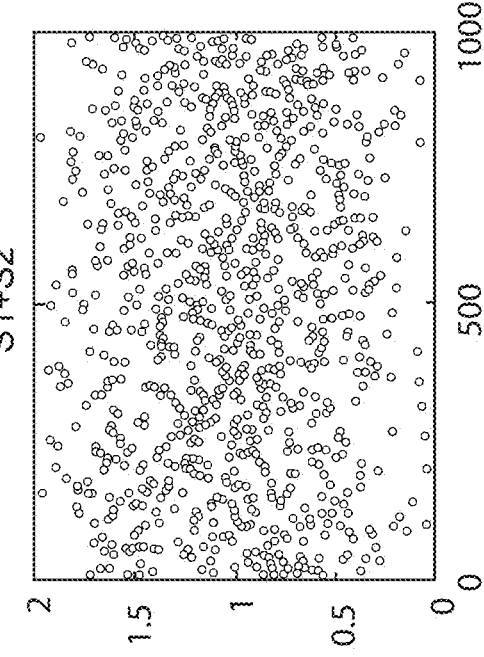

This dither leaking has a negative impact on the seismic data corresponding to the sources that are not aligned as now discussed. FIG. 9A shows a uniform random low-discrepancy distribution for the source S1 (of FIG. 8B) and FIG. 9B shows a uniform random low-discrepancy distribution for the source S2 (of FIG. 8B). Because the alignment in FIG. 8B is for the data corresponding to source S1, this effectively means that the S1 dithers are added or subtracted to sources S2 and S3. If only sources S1 and S2 are considered, the resulting effective distribution for source S2 will be a so-called Irwin-Hall distribution, as illustrated in FIG. 9C. A similar distribution is obtained when the data for S2 or S3 is aligned. The concept is the same to adding the faces from two dice. In this case, it is more likely to get 5, 6 or 7 compared to getting 2 or 12. Adding even more dice (N→infinity), the summed distribution will be Gaussian. This is undesired because the data clusters as illustrated in FIGS. 9C and 9D. In other words, although the distribution for each individual source may be constructed to be a uniform random low-discrepancy sequence, due to the dither leaking, the combination of two uniform random low-discrepancy sequences does not result in another uniform random low-discrepancy sequence.

A non-uniform and high-discrepancy (Irwin-Hall) distribution as illustrated in FIGS. 9C and 9D is not ideal for deblending. To achieve the best possible deblending results, it is desired that the effective dither times ($S1(i)+S2(i)$, $S2(i)+S3(i)$ and $S3(i)+S1(i+1)$) to be (1) uniform random and (2) low-discrepancy. Here T denotes the shot numbering, where i belongs to interval [1,number of shots]. For example, 'i=1' denotes the first firing of S1, S2 and S3, while i=n denotes the n'th firing.

To solve this problem, two conditions need to be achieved. First, it is desired that each of sources S1, S2 and S3 follow a distribution so that the effective dither $S1(i)$-$S2(i)$, $S2(i)$-$S3(i)$ and $S3(i)$-$S1(i+1)$ becomes uniform random. Second, it is desired to apply an anti-clustering condition to make sure that the effective dithering sequences also are low-discrepancy.

These conditions are now implemented in numerical terms as discussed next. In analytical mathematics, no closed form solution exists to make pairs of sequences that when combined, result in a uniform random low-discrepancy sequence. A proof of this fact can be found, for example, in Grimmet and Stirzaker, 2001. However, it is possible to numerically construct S1, S2 and S3 dithering sequences with (close to) the desired properties by still generating random numbers to be added to the sequence for each source and at the same time requiring the low-discrepancy condition (anti-clustering) to be applied to the effective dithers ($S1(i)$-$S2(i)$, $S2(i)$-$S3(i)$ and $S3(i)$-$S1(i+1)$).

Figure 10A:
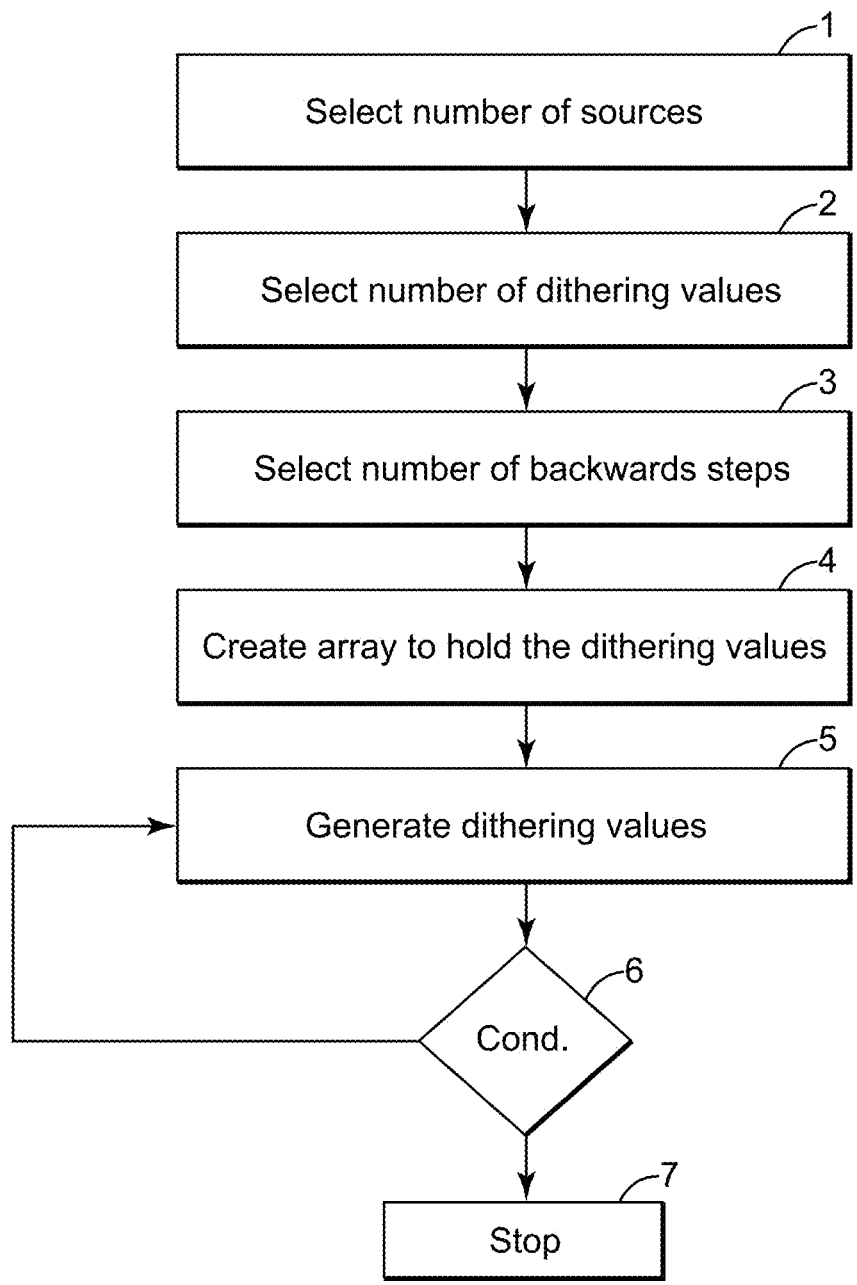

The basic algorithm to achieve these sequences is illustrated in FIG. 10A and includes a step 1 of selecting the number of source N (as given by the survey layout; N is typically between 2 and 10), a step 2 of selecting the number of dithering values nPoints, a step 3 of selecting the number of backwards steps to use for imposing the anti-clustering condition (e.g., 2 to 10 backward steps may be used), a step 4 of creating an array of dithering values source_d(N, nPoints) to hold the dithers, and a step 5 of generating more dithers. Step 5 is repeated until the number of generated dithers reaches nPoints. Step 5 includes a sub-step of generating M (or a number of) candidate dithers (e.g., using uniform random numbers), a sub-step of checking whether each of these numbers fulfill the anti-clustering condition of the effective dithers, and a sub-step of accepting those candidates that fulfill the anti-clustering condition into the dithering value array d(N, nPoints). In step 6, the method verifies whether the number of generated dithers reaches number N. If the answers is no, the method returns to step 5. If the answer is yes, the method stops in step 7.

A full pseudo-code (MatLab) 1000 is shown in FIG. 10B and achieves these goals as now discussed. Although the pseudo-code 1000 shows how to obtain the sequences for only three sources S1-S3, one skilled in the art would easily understand how to extend the pseudo-code to any number of sources. In block 1002, the number of points nPoints for each sequence is selected, and the number of backwards nBackstep values to be checked is also selected.

In block 1004, the f-function that controls the anti-clustering is set up. In this example, the f-function is set up to be gradually reduced within each iteration of the while-loop in order to ensure that a solution is found within a reasonable computational time. However, in one embodiment, it is possible that the f-function is constant, i.e., its values do not change with the shot number "i." In block 1006, a dithering value array source_d that would hold the dithering sequences of the sources is generated and initialized. Note that no_src in this array represents the number of sources. In step 1008, various counters are initialized.

In block 1010, the elements (or weights) of the f-function are scaled down to ensure that a solution is found and in block 1012 a random number for each source sequence is generated. For this particular case, block 1012 generates three random numbers, one for each of the three sources S1 to S3. In block 1014, each random number generated in block 1012 is checked to satisfy the anti-clustering condition for the case when the dithering of one source leaks into the dithering of another source. In this particular example, if the seismic data is aligned for the first source S1, the anti-clustering condition is that the absolute value of the difference between the random number for source $S1(i)$ and the random number for the source $S2(i)$ (generated in block 1012), is smaller than a corresponding value of the f-function. A similar anti-clustering condition is used for the second source $S2(i)$. However, a slightly different anti-clustering condition is used for the third (last) source $S3(i)$. For this case, the anti-clustering condition is checked against the next shot $S1(i+1)$ (see the last part of block 1014). By satisfying all these three conditions at the same time, the method ensures that when the dithering from one source leaks into the dithering of another source, the distribution for the combined sources is close to uniform random and low-discrepancy. If a solution is found in block 1016, which satisfies the anti-clustering condition, the random numbers generated in block 1012 are added to the source_d sequence (see block 1016).

In block 1018, the random numbers that are in excess of the required nPoints are discarded. The above discussed algorithm produces dither times in the [0, 1] range. It is straight forward to scale this range to whatever dithering range a particular survey would require. Thus, the generated sequences source_d for the three sources S1 to S3, when combined in pairs, would generate a discrete dithering sequence that is uniform random and low-discrepancy.

Figure 11A:
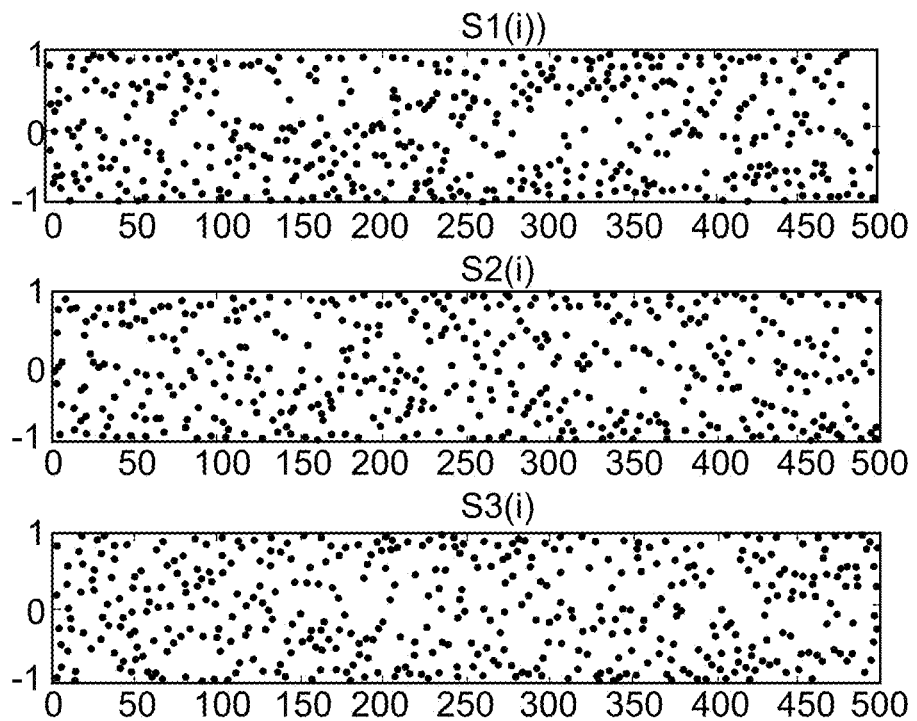
FIGS. 11A and 11B illustrate three such dithering sequences for three different sources and FIGS. 12A and 12B show the combinations of pairs of such dithering sequences that resulted in uniform random low-discrepancy sequences.
Figure 11B:
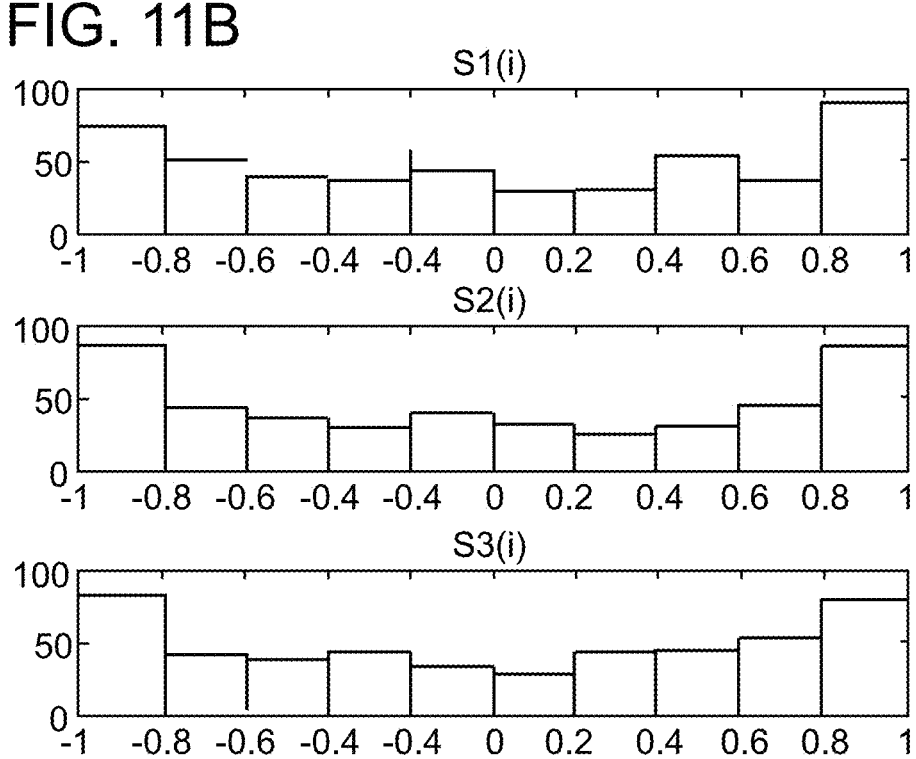
Figure 12A:
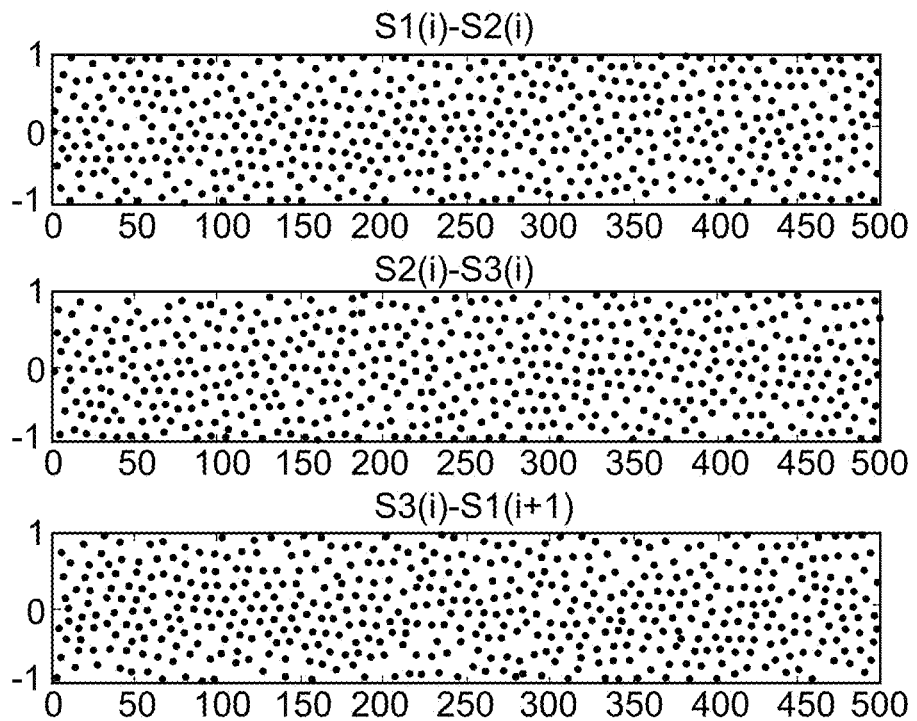
Figure 12B:
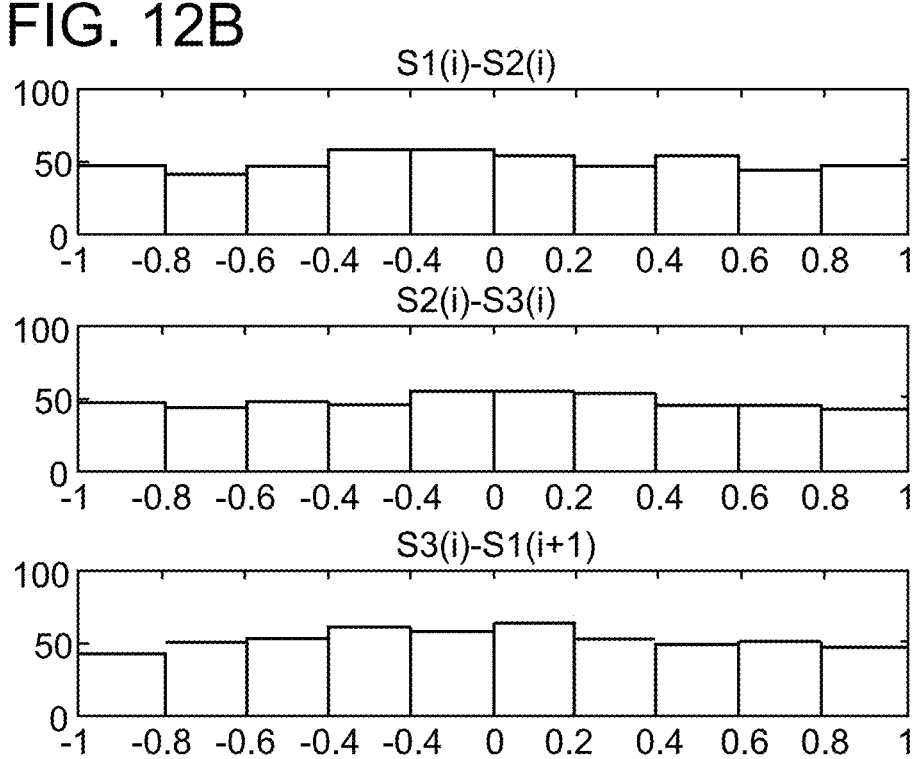

The three dithering sequences built for sources S1 to S3 based on the methods of FIGS. 10A and 10B are shown in FIG. 11A and their distributions are illustrated in FIG. 11B. It is noted in FIG. 11A that the dither times cluster around 0 and 1. The effective dithers (S1($i$)+S2($i$), S2($i$)+S3($i$) and S3($i$)+S1($i$+1)) are shown in FIG. 12A and their histograms are shown in FIG. 12B. These figures show the anti-clustering (low-discrepancy) and uniform distributions.

With regard to the method discussed in FIG. 10B, the step of choosing the correct amount of anti-clustering should be carefully considered. The anti-clustering is controlled by scalars in the f array and the number of backwards steps (nBacksteps) variable in the pseudo-code, which makes sure that any new accepted value is sufficiently different from the nBacksteps previous values. In this particular case, an f array with a length of 7 and coefficients from [~0.3 . . . ~0.1] was used (checking the minimum distance to the 7 previously chosen numbers). In one embodiment, suitable coefficient values for the f array may be found by trial and error. However, many possible solutions exist whereby one can combine a given length of f with given coefficients. The algorithm can be extended to work for other number of sources (dual, triple, quadruple, penta, hexa, . . . , etc.).

With a triple source as an example, it is possible to extend the algorithm to produce low discrepancy uniform random distributions for both S1-S2, and S1-S3. This is referred to as N+1 deblending and N+2 deblending, respectively. By doing so (adding extra checks in the algorithm in FIG. 10B), it would enable the deblending of both S2 and S3 from S1—potentially allowing for very long clean record lengths. In fact, this can be extended even further, N+3, N+4 and so on.

Figure 13A:
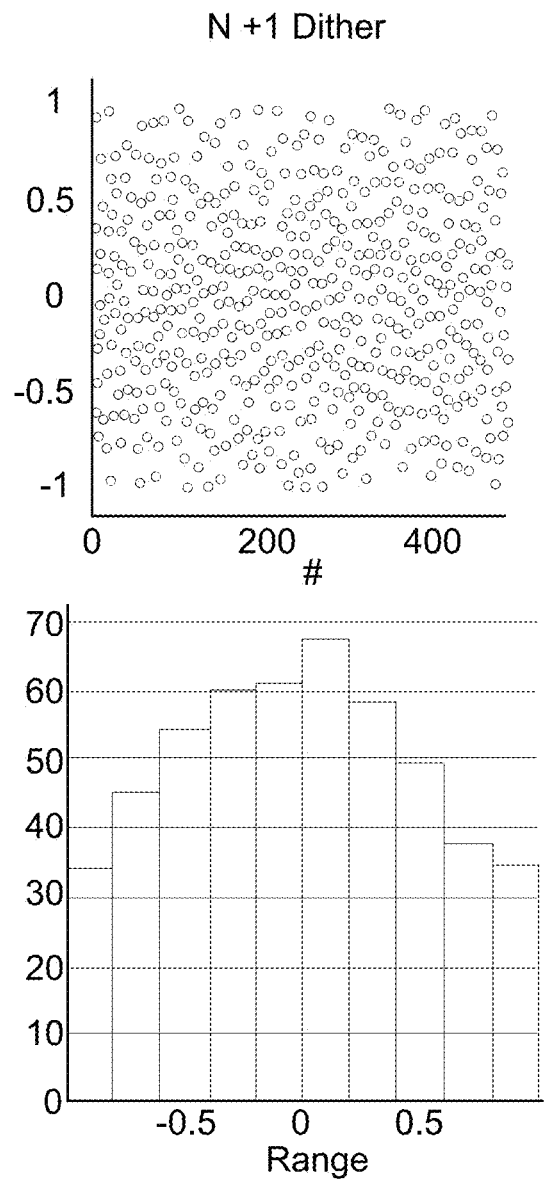
FIGS. 13A and 13B illustrate N+1 and N+2 effective dithers for a typical realization.
Figure 13B:
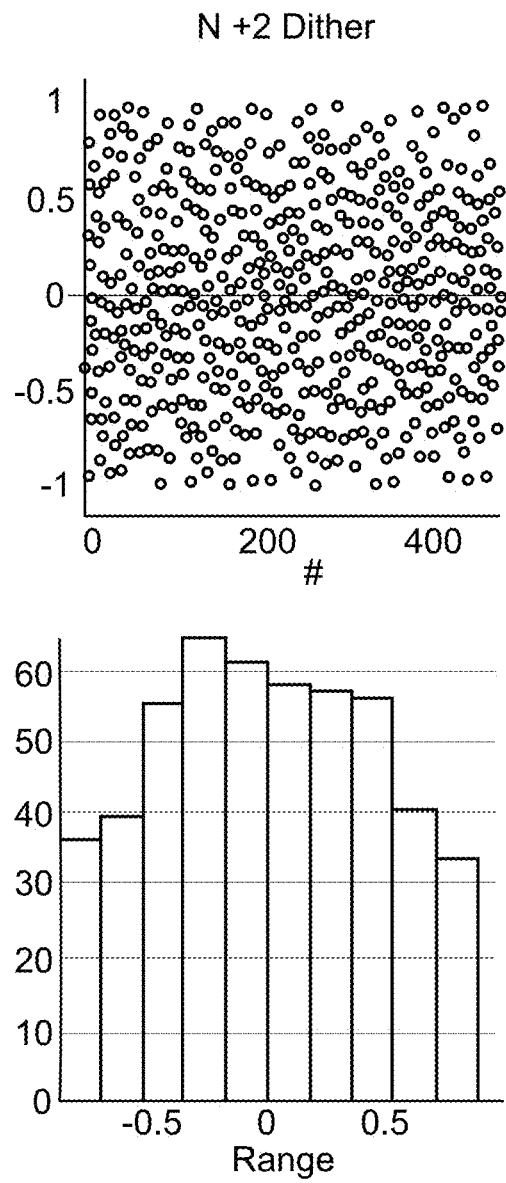

However, numerical experiments have shown that it is difficult to get a perfectly uniform distribution in these cases. Values tend to be somewhat more densely distributed in the middle of the domain, compared to at the edges. This is illustrated in FIGS. 13A and 13B, which show both the N+1 and the N+2 effective dithers for a typical realization. As can be seen in FIGS. 13A and 13B, the histograms are not perfectly flat. Nevertheless, they are what referred to as being close to uniform random, while maintaining a nice low discrepancy appearance.

Figure 14A:
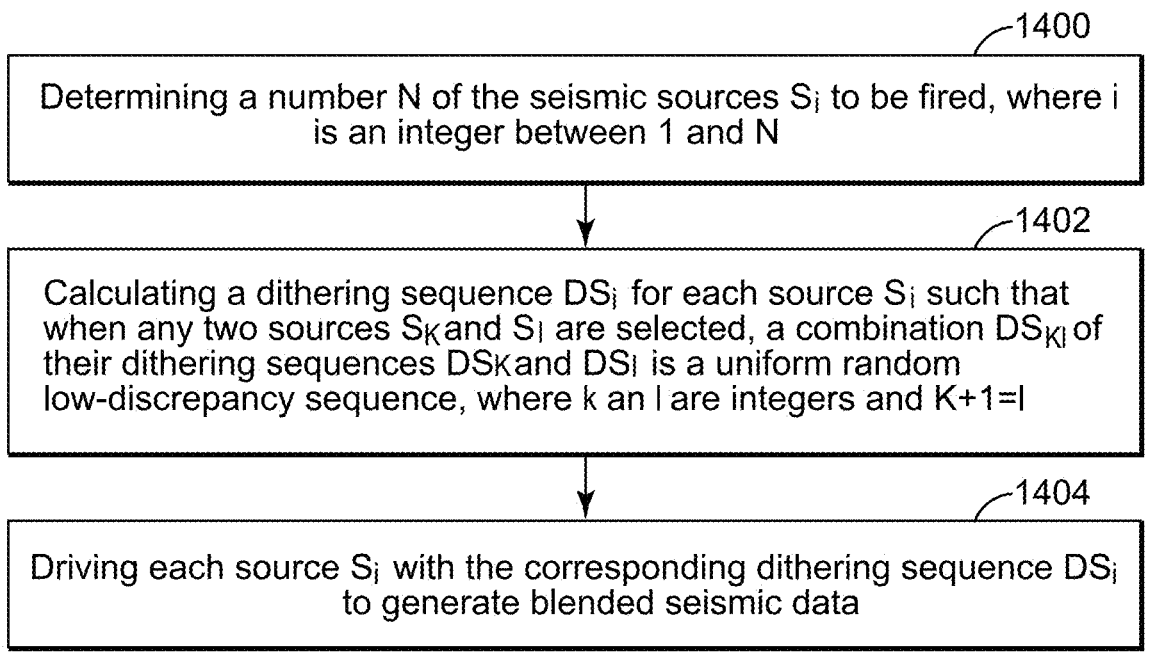
FIGS. 14A and 14B are flowcharts of a method for generating dithering sequences that, when combined, result in a uniform random low-discrepancy sequence.
Figure 14B:
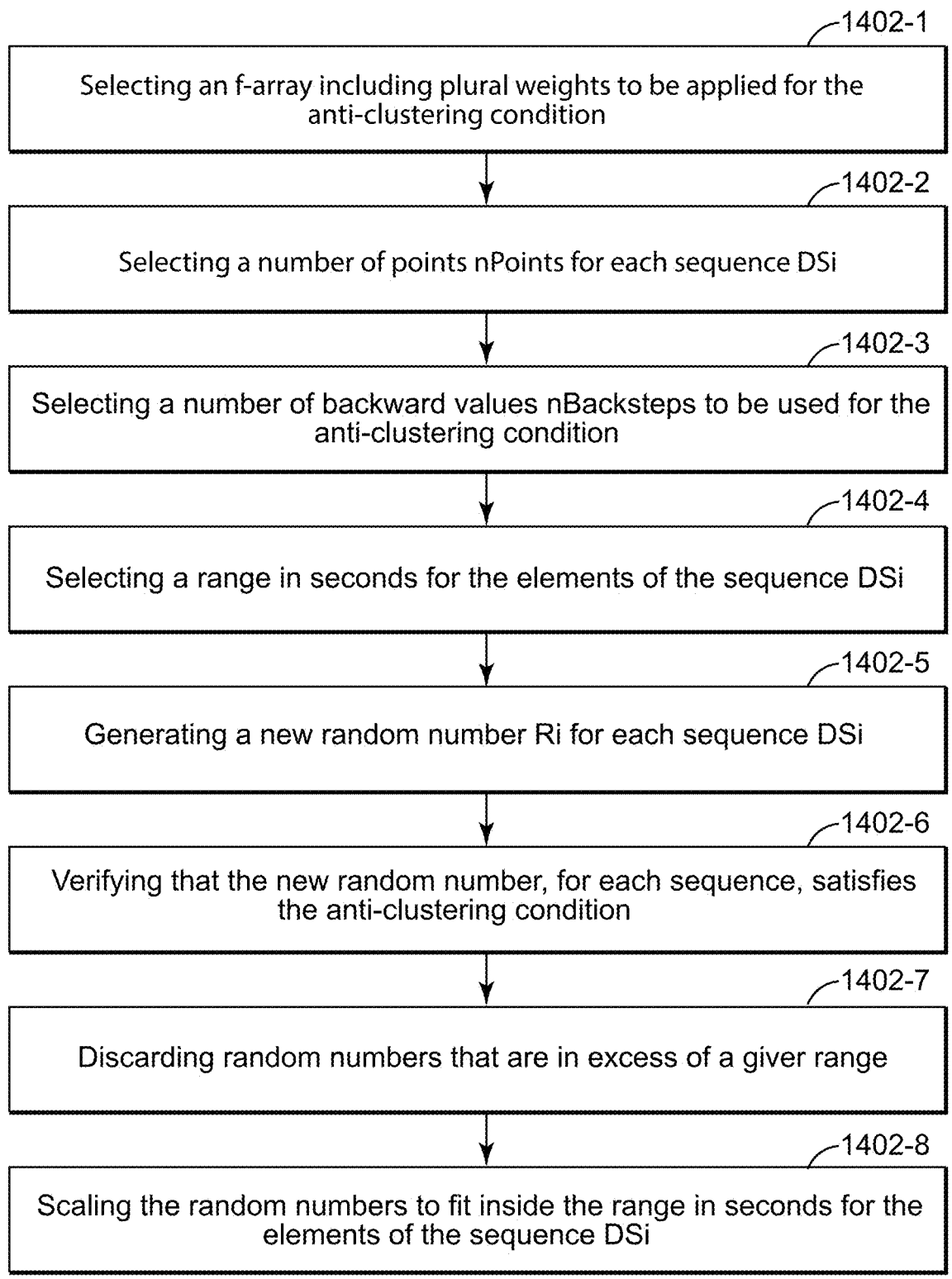

The method discussed in FIG. 10B with regard to the Matlab pseudo-code is now summarized as a flowchart in FIGS. 14A and 14B. This method generates dithering sequences $DS_i$ for marine seismic sources $S_i$ in a marine acquisition system. The method includes a step 1400 of determining a number N of the seismic sources $S_i$. The number of seismic sources may be received, for example, from the operator of the seismic survey. In step 1402, the method calculates a dithering sequence $DS_i$ for each source $S_i$ such that when any two consecutive sources $S_k$ and $S_l$ are selected (where k=l+1), a combination $DS_{kl}$ of their dithering sequences $DS_k$ and $DS_l$ is close to uniform random low-discrepancy sequence. The term "uniform random" means that each element of the dithering sequence $DS_{kl}$ is randomly generated with a statistically speaking uniform distribution, and the term "low-discrepancy" means that an anti-clustering condition is applied to each element of each dithering sequence $DS_{kl}$. The method further includes a step 1404 of driving each source $S_i$ with the corresponding dithering sequence $DS_i$ to generate blended seismic data.

The step 1402 of calculating the dithering sequence $DS_i$ is schematically illustrated in FIG. 14B and includes a sub-step 1402-1 of selecting an f-array including plural weights/coefficients to be applied for the anti-clustering condition to ensure that consecutive dithers are sufficiently different, avoiding any clustering. The weights (f-array) are also gradually scaled down to ensure that a solution is found in each iteration of the algorithm within a reasonable computational time. In this particular case, the scaling is done with an exponential decay. It is of course possible to also do the scaling in other ways, or to drop this step entirely. Step 1402 further includes a sub-step 1402-2 of selecting a number of points nPoints for each sequence $DS_i$; and a sub-step 1402-3 of selecting a number of backward values nBacksteps to be used for the anti-clustering condition. A sub-step 1402-4 of selecting a range in seconds for the elements of the sequence $DS_i$ is optional.

Step 1402 further includes a sub-step 1402-5 of generating a new candidate dither(s) Ri, for each sequence $DS_i$; and a sub-step 1402-6 of verifying that the new candidate dither(s), for each sequence, satisfies the anti-clustering condition. The anti-clustering condition verifies, for each candidate dither number R, and for each pair of seismic sources $S_k$ and $S_l$, that a relation between the candidate dithers $R_k$ and $R_l$ is larger than a corresponding weight of the f-array.

Step 1402 further includes sub-step 1402-7 of discarding any extra dithering times that were generated. Optionally, step 1402-8 scales the dithering times $S_i$ to fit inside the range in seconds for the elements of the sequence $DS_i$.

Figure 15A:
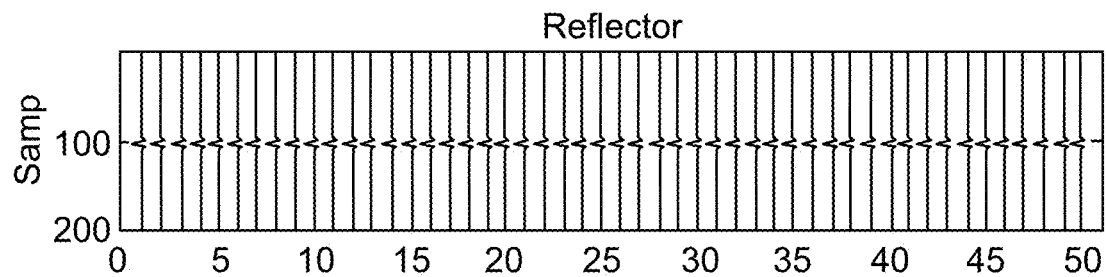
FIG. 15A illustrates a synthetic reflector.
Figure 15B:
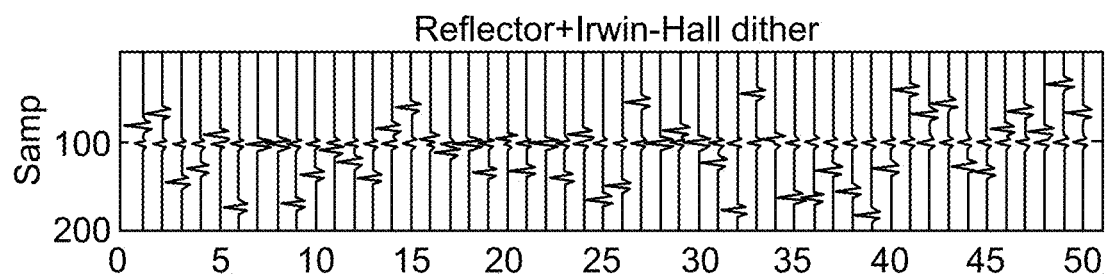
FIG. 15B illustrates an Irwin-Hall dither and FIG. 15C illustrates a uniform random low-discrepancy dither.

The above discussed method has been applied to various synthetic and real examples and an improvement in the deblending has been observed. As the synthetic example is simpler to appreciate than the real example, only the synthetic example is discussed herein. A synthetic CMP-gather was generated to have 50 traces, and one flat reflector was produced (see FIG. 15A) by a 50 Hz Ricker wavelet. The blended data has been simulated by applying to the flat event in FIG. 15A a ±100 ms dithered signal at twice the amplitude with a traditional uniform random distribution for each source. This example simulates acquired seismic data with traditional random sequences for each source, which results in an Irwin-Hall overall dither as shown in FIG. 15B. In addition, the blended data has been simulated with dither sequences based on the method of FIG. 10B. This example simulates acquired seismic data with uniform random low-discrepancy combined sequences as shown in FIG. 15C.

Figure 15C:
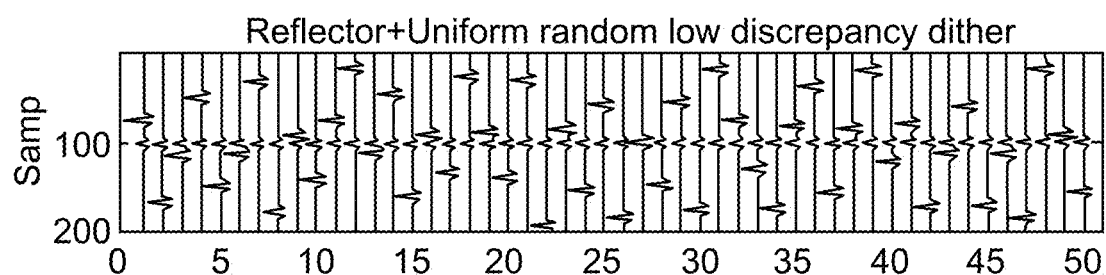

Two different experiments were run on the datasets of FIGS. 15B and 15C. The first experiment just stacked up the data, and looked at the RMS and NRMS of the resulting trace compared to the unblended data. The average results from several thousand trials showed that the RMS values were reduced by about 1% when the uniform random low-discrepancy dither was used compared to the Irwin-Hall dither. Interestingly, the NRMS results (comparing blended with unblended stack) showed no significant difference.

In the second experiment, a prediction error filter (filter designed to attenuate random noise) was applied to the blended data before it was stacked. This was to simulate a deblending process. After deblending, the RMS values of the stacks were almost exactly the same. However, it was found a clear improvement (13%) in the NRMS when the low-discrepancy uniform random sequence was used compared to the Irwin-Hall sequence. The reason for this improvement is most likely that the uniform random low-discrepancy dither is more 'random' than an Irwin-Hall sequence. The prediction error filter therefore does a better job in attenuating noise with this type of dither. The results of these experiments are summarized in FIG. 16.

The above embodiments have shown how to numerically construct a close to optimal dither sequence for use in multisource blended acquisition scenarios where the effective record length is extended. Experiments show that compared to just pure random dithering, the proposed novel dithering sequence provides a significant NRMS uplift at no additional cost. This kind of uplift may be very important in, for example, a 4D setting, where one tries to detect a weak signal masked by background noise.

Figure 17:
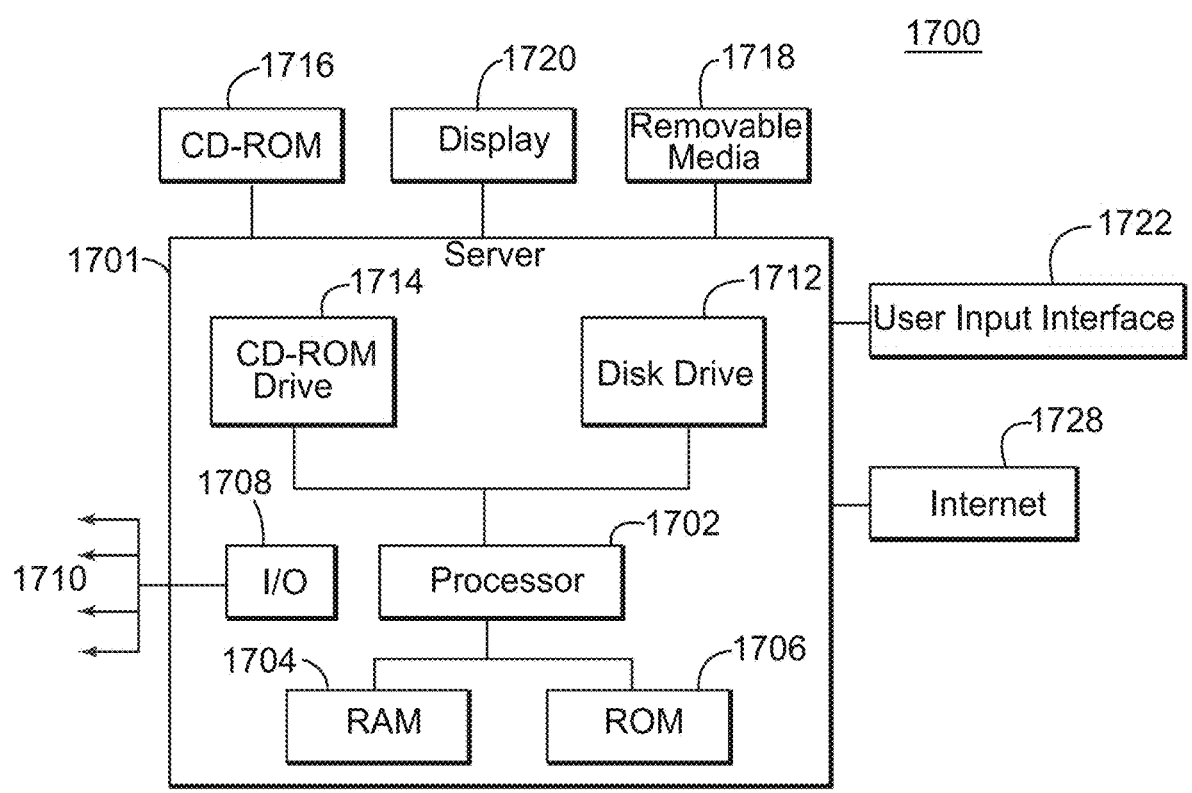
FIG. 17 illustrates a computing device in which the methods discussed herein may be implemented.

The above-discussed methods may be implemented in a computing device as illustrated in FIG. 17. Hardware, firmware, software or a combination thereof may be used to perform the various steps and operations described herein.

Exemplary computing device 1700 suitable for performing the activities described in the above embodiments may include a server 1701. Such a server 1701 may include a central processor (CPU) 1702 coupled to a random access memory (RAM) 1704 and to a read-only memory (ROM) 1706. ROM 1706 may also be other types of storage media to store programs, such as programmable ROM (PROM), erasable PROM (EPROM), etc. Processor 1702 may communicate with other internal and external components through input/output (I/O) circuitry 1708 and bussing 1710 to provide control signals and the like. Processor 1702 carries out a variety of functions as are known in the art, as dictated by software and/or firmware instructions.

Server 1701 may also include one or more data storage devices, including hard drives 1712, CD-ROM drives 1714 and other hardware capable of reading and/or storing information, such as DVD, etc. In one embodiment, software for carrying out the above-discussed steps may be stored and distributed on a CD-ROM or DVD 1716, a removable media 1718 or other form of media capable of portably storing information. These storage media may be inserted into, and read by, devices such as CD-ROM drive 1714, disk drive 1712, etc. Server 1701 may be coupled to a display 1720, which may be any type of known display or presentation screen, such as LCD, plasma display, cathode ray tube (CRT), etc. A user input interface 1722 is provided, including one or more user interface mechanisms such as a mouse, keyboard, microphone, touchpad, touch screen, voice-recognition system, etc.

Server 1701 may be coupled to other systems, such as a navigation system, GPS, and/or streamers. The server may be part of a larger network configuration as in a global area network (GAN) such as the Internet 1728, which allows ultimate connection to various landline and/or mobile computing devices.

The disclosed exemplary embodiments provide a system and a method for generating individual source dithering sequences which, when combined in pairs, results in a uniform random low-discrepancy sequence. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

M. Barbier and P. Staron [1974], Method of exploring a medium by transmitting energy emitted in the form of separate impulses and its application to seismic prospecting. U.S. Pat. No. 3,811,111 A.

R. G. Borselen and R. H. Baardman [2014], Systems and methods for randomizing firing times of simultaneous sources in marine surveys. US 20140269169 A1.

E. Braaten and G. Weller [1979], An Improved Low-Discrepancy Sequence for Multidimensional Quasi-Monte Carlo Integration. J. Comput. Phys., 33:249-258, 1979.

Diarra, C. [2016], Determining optimal dithering for blended acquisition. Master thesis Polytech Paris-UPMC.

Grimmett, G. and Stirzaker, D. [2001], Probability and random processes, Vol. 80, Oxford University Press.

Hager, E., Kneale, R., Hansen, L. and Thompson, T. [2016], Baxter: a high resolution penta-source marine 3D acquisition. 86th SEG International Annual Meeting. Expanded Abstract, 173-177.

Kocis, I., and White, W., [1997], Computational investigation of a low discrepancy sequence. ACM Trans. Math. Soft., 23:266-294, 1997.

M. Maraschini, R. Dyer, K. Stevens, D. Bird, [2012], Source Separation by Iterative Rank Reduction—Theory and Applications: 74th EAGE Conference & Exhibition incorporating SPE EUROPEC 2012.

Moore, I. W. Dragoset, T. Ommundsen, D. Wilson, C. Ward, and D. Eke. [2008], Simultaneous source separation using dithered sources: 78th Annual International Meeting, SEG, Expanded Abstracts, 2806-2809.

Peng, C., Liu, B., Khalil, A. and Poole, G. [2013], Deblending of simulated simultaneous sources using an iterative approach: an experiment with variable-depth streamer data. 83th SEG International Annual Meeting, Expanded Abstracts, 4278-4282.

Poole, G., Stevens, K., Marschini, M., Mensch, T. and Siliqi, R. [2014], Blended dual-source acquisition and processing of broadband data. 76th EAGE Conference & Exhibition, Extended Abstracts.

Vaage, S. T., Martinez, R. D., Brittan, J. J [2002], Method for separating seismic signals from two or more distinct sources, U.S. Pat. No. 6,882,938 B2.

Vinje, V., Siliqi, R., Nilsen, C-I., Hicks, E., Camerer, A. D., Lie, J. E., Danielsen, V., Dhelie P-E. [2017], TopSeis—shooting over the seismic spread, First Break (6), 2017.

What is claimed is:

1. A method for generating discrete dithering sequences $DS_i$ for marine seismic sources $S_i$ in a marine acquisition system, the method comprising:

determining (1400) a number N of the seismic sources $S_i$ to be fired;

calculating (1402) a dithering sequence $DS_i$ for each source $S_i$ such that when any two consecutive source activation $S_k$ and $S_l$, where l=k+1, are selected, a combination $DS_{kl}$ of their dithering sequences $DS_k$ and $DS_l$ is a uniform random low-discrepancy sequence; and driving (1404) each source $S_i$ with the corresponding dithering sequence $DS_i$ to generate blended seismic data, wherein uniform random means that any value within a given interval is equally likely or close to equally likely to be drawn, and low-discrepancy means that a proportion of points in the uniform random low-discrepancy sequence falling into an arbitrary set B is close to proportional to a measure of B.

2. The method of claim 1, wherein the low-discrepancy is obtained by imposing an anti-clustering condition to each element of each dithering sequence $DS_i$.

3. The method of claim 1, further comprising:
selecting the number of dithering values (nPoints) for each source;
selecting a number of backward values (nBacksteps) to be used for the anti-clustering condition; and
selecting a time range defined by a minimum dither time and a maximum dither time, in seconds, for the elements of the sequence $DS_i$.

4. The method of claim 3, further comprising:
in a loop, generating new candidate random numbers R for each sequence DS; and
checking if the new random numbers, for each sequence, satisfies the anti-clustering condition.

5. The method of claim 4, wherein the nBacksteps values in the anti-clustering condition are gradually scaled down in each iteration to ensure that the candidate random numbers are accepted.

6. The method of claim 4, further comprising:
discarding random numbers that are in excess of a given range.

7. The method of claim 6, further comprising:
scaling remaining accepted random numbers to fit inside the range in seconds for the elements of the sequence $DS_i$ selected by a user.

8. The method of claim 1, wherein additional checks are performed to also ensure that a combination $DS_{kl}$ of their dithering sequences $DS_k$ and $DS_l$ from sources $S_k$ and $S_l$, where l=k+2, are uniform random or close to being uniform random and low discrepancy.

9. A computing device (1700) for generating discrete dithering sequences $DS_i$ for marine seismic sources $S_i$ in a marine acquisition system, the computing device comprising:
an interface (1708) configured to receive (1400) a number N of the seismic sources $S_i$ to be fired; and
a processor (1708) connected to the interface and configured to,
calculate (1402) a dithering sequence $DS_i$ for each source $S_i$ such that when any two consecutive source activations $S_k$ and $S_l$, where l=k+1, are selected, a combination $DS_{kl}$ of their dithering sequences $DS_k$ and $DS_l$ is a uniform random low-discrepancy sequence; and
drive (1404) each source $S_i$ with the corresponding dithering sequence $DS_i$ to generate blended seismic data,
wherein uniform random means that any value within a given interval is equally likely or close to equally likely to be drawn, and low-discrepancy means that a proportion of points in the uniform random low-discrepancy sequence falling into an arbitrary set B is close to proportional to a measure of B.

10. The computing device of claim 9, wherein the low-discrepancy is obtained by imposing an anti-clustering condition to each element of each dithering sequence $DS_i$.

11. The computing device of claim 9, wherein the interface also receives:
the number of dithering values (nPoints) for each source;
a number of backward values (nBacksteps) to be used for the anti-clustering condition; and
a time range defined by a minimum dither time and a maximum dither time, in seconds, for the elements of the sequence $DS_i$.

12. The computing device of claim 11, wherein the processor is configured to:
in a loop, generate new candidate random numbers R for each sequence DS; and
check if the new random numbers, for each sequence, satisfies the anti-clustering condition.

13. The computing device of claim 12, wherein the processor is further configured to:
discard random numbers that are in excess of a given range.

14. The computing device of claim 13, wherein the processor is further configured to:
scale remaining accepted random numbers to fit inside the range in seconds for the elements of the sequence $DS_i$ selected by a user.

15. The computing device of claim 11, wherein the nBacksteps values in the anti-clustering condition are gradually scaled down in each iteration to ensure that the candidate random numbers are accepted.

16. The computing device of claim 11, wherein additional checks are performed to also ensure that a combination $DS_{kl}$ of their dithering sequences $DS_k$ and $DS_l$ from sources $S_k$ and $S_l$, where l=k+2, are uniform random or close to being uniform random and low discrepancy.

17. A non-transitory computer readable medium including computer executable instructions, wherein the instructions, when executed by a processor, implement instructions for generating discrete dithering sequences $DS_i$ for marine seismic sources $S_i$ in a marine acquisition system, the instructions comprising:
determining (1400) a number N of the seismic sources $S_i$ to be fired;
calculating (1402) a dithering sequence $DS_i$ for each source $S_i$ such that when any two consecutive source activation $S_k$ and $S_l$, where l=k+1, are selected, a combination $DS_{kl}$ of their dithering sequences $DS_k$ and $DS_l$ is a uniform random low-discrepancy sequence; and
driving (1404) each source $S_i$ with the corresponding dithering sequence $DS_i$ to generate blended seismic data,
wherein uniform random means that any value within a given interval is equally likely or close to equally likely to be drawn, and low-discrepancy means that a proportion of points in the uniform random low-discrepancy sequence falling into an arbitrary set B is close to proportional to a measure of B.

18. The medium of claim 17, wherein the low-discrepancy is obtained by imposing an anti-clustering condition to each element of each dithering sequence $DS_i$.

19. The medium of claim 17, wherein the instructions further cause:
selecting the number of dithering values (nPoints) for each source;
selecting a number of backward values (nBacksteps) to be used for the anti-clustering condition; and selecting a time range defined by a minimum dither time and a maximum dither time, in seconds, for the elements of the sequence $DS_l$.

20. The medium of claim 17, wherein additional checks are performed to also ensure that the combined dither from sources $S_k$ and $S_l$, where l=k+2, are uniform random or close to being uniform random and low discrepancy.

* * * * *